(12) United States Patent
Bell, Jr. et al.

(10) Patent No.: US 7,808,879 B2
(45) Date of Patent: *Oct. 5, 2010

(54) OPTICAL DISK DRIVE WITH MICRO-SIL

(75) Inventors: Bernard W. Bell, Jr., Lafayette, CO (US); Scott Wilson, Lafayette, CO (US); David H. Davies, Boulder, CO (US); David L. Blankenbeckler, Longmont, CO (US); Steven H. Ray, Longmont, CO (US)

(73) Assignee: DPHI Acquisitions, Inc., Longmont, CO (US)

( * ) Notice: Subject to any disclaimer, the term of this patent is extended or adjusted under 35 U.S.C. 154(b) by 1269 days.

This patent is subject to a terminal disclaimer.

(21) Appl. No.: 11/148,140

(22) Filed: Jun. 8, 2005

(65) Prior Publication Data

US 2006/0280102 A1 Dec. 14, 2006

(51) Int. Cl.
*G11B 7/00* (2006.01)
(52) U.S. Cl. ................. 369/121; 369/112.23; 369/44.19
(58) Field of Classification Search ............ 369/112.23, 369/13.33
See application file for complete search history.

(56) References Cited

U.S. PATENT DOCUMENTS

| 5,448,548 | A | * | 9/1995 | Taneya et al. ................ 369/121 |
| 5,832,009 | A | * | 11/1998 | Kikuchi ........................ 372/21 |
| 6,041,031 | A | * | 3/2000 | Ichimura et al. .......... 369/13.32 |
| 6,069,853 | A | | 5/2000 | Novotny et al. |
| 6,160,769 | A | | 12/2000 | Ohnuki et al. |
| 6,243,350 | B1 | | 6/2001 | Knight et al. |
| 6,441,359 | B1 | * | 8/2002 | Cozier et al. ................ 250/216 |
| 6,724,694 | B2 | * | 4/2004 | Knight et al. ............. 369/13.55 |
| 7,388,823 | B2 | * | 6/2008 | Nakata ......................... 369/116 |
| 2005/0180272 | A1 | * | 8/2005 | Bell et al. ................. 369/44.14 |

* cited by examiner

*Primary Examiner*—Wayne R Young
*Assistant Examiner*—Adam R Giesy
(74) *Attorney, Agent, or Firm*—Haynes & Boone, LLP.

(57) ABSTRACT

A small form factor optical disk drive is provided that incorporates a SIL/objective lens assembly. A laser for the small form factor optical disk drive has a coherence function having maxima spaced apart by intervals. The optical disk drive is configured such that a roundtrip optical path through the SIL/objective lens assembly is such that a coherence value for the laser is located in one of the intervals.

15 Claims, 10 Drawing Sheets

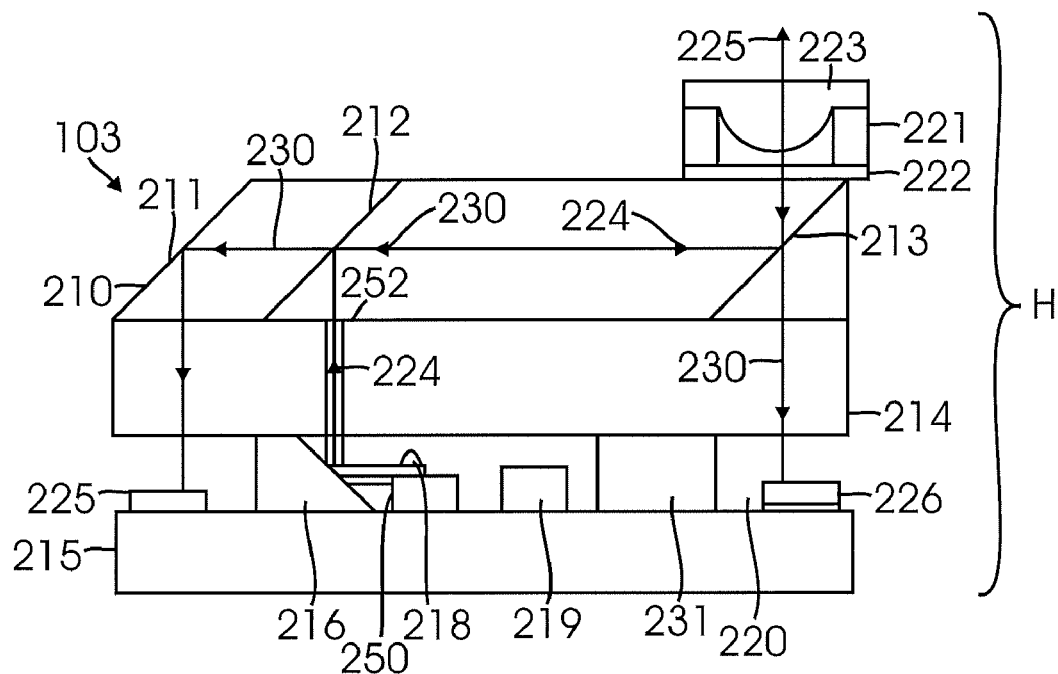
FIG. 1A  --PRIOR ART--
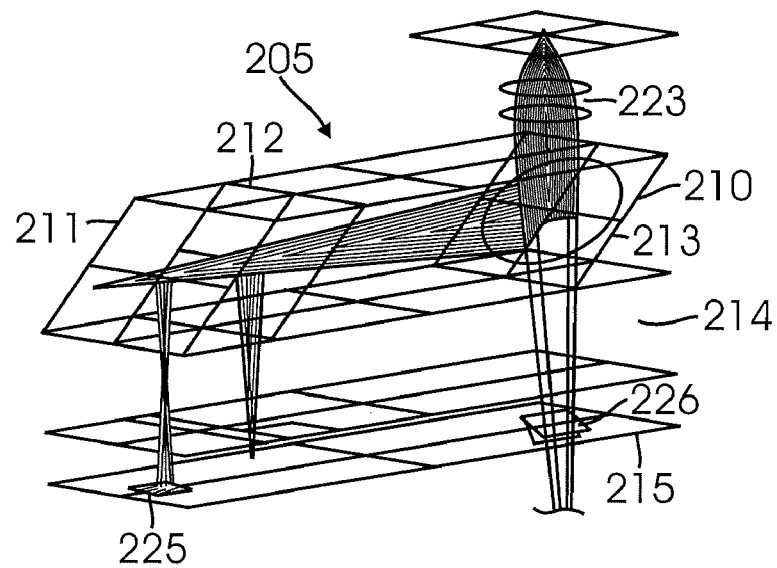
FIG. 1B  --PRIOR ART--

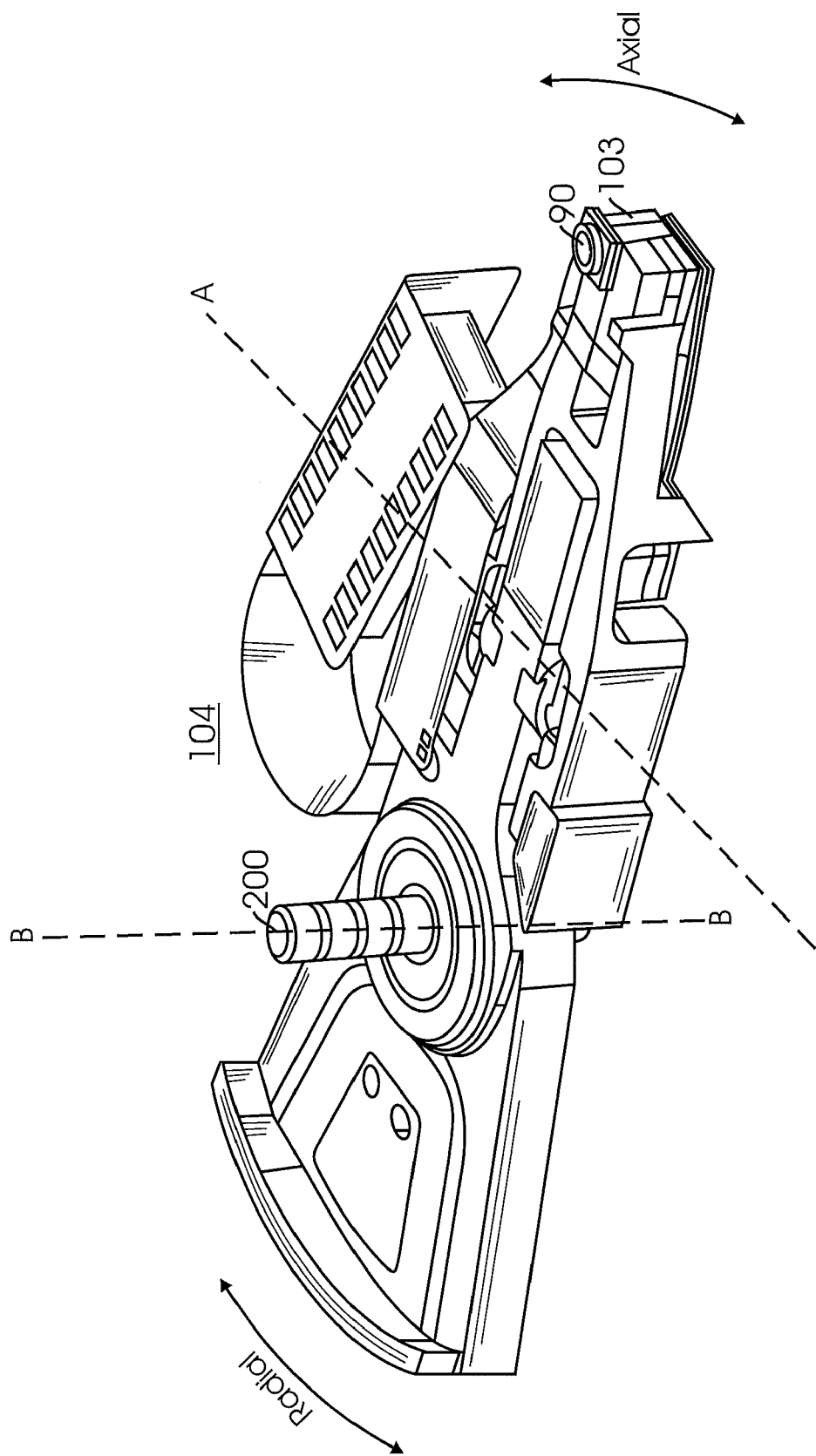
FIG. 2 -- PRIOR ART --

OPTICAL DISK DRIVE WITH MICRO-SIL

TECHNICAL FIELD

This invention relates to a small form-factor optical data storage device configured to use removable media cartridges.

BACKGROUND

Many barriers exist to minimizing the form factor of optical disk drives. For example, conventional optical disk drives such as a CD-ROM drive are configured for use with "second surface" optical disks. In a second surface optical disk, the information layer is covered by a relatively thick protective layer or substrate that is hundreds of microns in thickness. Considering that conventional laser light used to read and write in optical drives has a wavelength in the range of from around 400 to 800 nanometers, the relatively thick protective layer is thus many wavelengths in thickness. As such, imperfections such as scratches, dust, and fingerprints on the surface of the protective layer are defocused with respect to the underlying information layer. In this fashion, CD-ROMs and other second surface disks may be handled by users and exposed to dusty environments without needing a protective cartridge.

Although the use of second surface disks provides this advantageous defocusing property, it is also accompanied by certain drawbacks. For example, the relatively thick protective layer covering the information layer introduces significant optical aberrations and wave front distortions. In turn, these optical problems place a floor on the achievable feature size in the information layer, thereby limiting data capacity. However, as the optical disk size is reduced, it is important to minimize feature size in the information layer to provide significant data storage capability despite the presence of a relatively small information layer area. To achieve a significant data capacity within a small form factor optical disk drive, the present assignee has developed first surface optical disks such as disclosed in U.S. Ser. No. 10/891,173, filed Jul. 13, 2004, which is a divisional application of U.S. Ser. No. 09/315,398, filed May 20, 1999, now abandoned, the contents of both applications being incorporated by reference herein in their entirety. In these first surface disks, an information layer covers a substrate, which may be formed to define one or both of a read-only and a writeable area. Advantageously, the information layer may be formed from a continuous phase-change material such as, for example, an SbInS or GeTe—Sb2Te3-Sb so that the formation of the read-only and writeable areas (if both exist) requires no masking or other complicated manufacturing processes. The surface of the information layer may be covered with an optical coupling layer formed from a sputtered dielectric such as silicon oxynitride or a spin-coated-high-refractive-index nano-particle dispersed material for instance. The optical coupling layer does not introduce the aberrations and wave front distortions that the protective layer in second surface optical disks does such that the feature size may be substantially reduced. In this fashion, a significant data capacity is achieved despite the presence of a small form factor.

The present assignee also developed a small form factor optical disk drive for use with the inventive first surface optical disks. For example, U.S. Ser. No. 09/950,378, filed Sep. 10, 2001, discloses an optical disk drive having an actuator arm with an optical pick-up unit (OPU) mounted on one end. A cross-sectional view of an OPU 103 is shown in FIG. 1a. A corresponding optical ray trace diagram for OPU 103 is illustrated in FIG. 1b. As seen in FIG. 1a, OPU 103 includes a periscope 210 having reflecting surfaces 211, 212, and 213. Periscope 210 is mounted on a transparent optical block 214. An object lens 223 is positioned on spacers 221 and mounted onto quarter wave plate (QWP) 222 which in turn is mounted on periscope 210. Optical block 214 is mounted through turning mirror 216 and spacer 231 to a silicon submount 215.

A laser 218 is mounted on a laser mount 217 and positioned on silicon submount 215. Detectors 225 and 226 are positioned and integrated onto silicon substrate 215. Laser 218 produces an optical beam 224 which is reflected into transparent block 214 by turning mirror 216. Beam 224 is then reflected by reflection surfaces 212 and 213 into lens 223 and onto an optical medium (seen in FIG. 1b). In some embodiments, reflection surfaces 212 and 213 can be polarization dependent and can be tuned to reflect substantially all of polarized optical beam 224 from laser 218. QWP 222 rotates the polarization of laser beam 224 so that a light beam reflected from the optical medium is polarized in a direction orthogonal to that of optical beam 224.

A reflected beam 230 from optical medium 102 is collected by lens 223 and focused into periscope 210. A portion (in some embodiments about 50%) of reflected beam 230, which is polarized oppositely to optical beam 224, passes through reflecting surface 213 and is directed onto optical detector 226. Further, a portion of reflected beam 230 passes through reflecting surface 212 and is reflected onto detector 225 by reflecting surface 211. Because of the difference in path distance between the positions of detectors 225 and 226, detector 226 is positioned before the focal point of lens 223 and detector 225 is positioned after the focal point of lens 223 as seen in FIG. 1b.

In some embodiments, optical surface 212 is nearly 100% reflective for a first polarization of light and nearly 100% transmissive for the opposite polarization. Optical surface 213 can be made nearly 100% reflective for the first polarization of light and nearly 50% reflective for the opposite polarization of light, so that light of the opposite polarization incident on surface 213 is approximately 50% transmitted. Optical surface 211 can, then, be made nearly 100% reflective for the opposite polarization of light. In that fashion, nearly 100% of optical beam 224 is incident on optical media 102 while 50% of the collected return light is incident on detector 226 and about 50% of the collected return light is incident on detector 225. A portion of laser beam 224 from laser 218 can be reflected by an annular reflector 252 positioned in periscope 210 on the surface of optical block 214. Annular reflector 252 may be a holographic reflector written into the surface of optical block 214 about the position that optical beam 224 passes. Annular reflector 252 reflects some of the laser power back onto a detector 250 integrated onto silicon submount 215. Detector 250 provides an Automatic Power Control (APC) signal that can be used in a servo system to control the output power of laser 218.

Turning now to FIG. 2, an exemplary actuator arm 104 is illustrated. Actuator arm 104 includes OPU 103 at one end. By rotating about an axis B through a spindle 200, actuator arm 104 may move OPU 103 radially with respect to an optical disk (a portion of which is illustrated in FIG. 1b). As used herein, radial movement is defined as movement parallel to an optical disk surface. Thus, to maintain tracking of an optical disk by OPU 103, a tracking servo will command a desired radial displacement of actuator arm 104. By flexing actuator arm 104 about an axis A, OPU 103 may move axially with respect to an optical disk to achieve a desired focus. As used herein, axial movement is defined as movement transverse to an optical disk surface. Thus, to maintain focus, a focus servo will command a desired axial displacement of actuator arm 104. By providing an actuator arm having these properties, a small form factor optical disk drive may be implemented. For example, the height of a disk drive incorporating OPU 103 may be as little as 10.5 mm. However, note that OPU 103 is aligned such that its height dimension H is normal to or in the axial direction with respect to an optical disk surface. Thus, the overall achievable height reduction of such a drive architecture is limited by the thickness of the optical disk and its cartridge as well as height H of OPU 103 (as measured from the bottom of OPU to the focused laser spot at the disk surface).

Additional height reduction may be achieved using the split-optics (which may also be denoted as a "sled-based") architecture disclosed in U.S. Ser. No. 11/052,367, filed Feb. 7, 2005, the contents of which are hereby incorporated by reference in their entirety. As seen in FIG. 3 and in the exploded view of FIG. 4, an optical pick-up unit (OPU) 300 is attached within a sled 305. Any suitable OPU design may be used, such as that used for OPU 103. However, note that the dimension H for OPU 300 now lies in the radial plane with respect to a corresponding optical disk (not illustrated). In contrast, dimension H for OPU 103 was in the axial plane, or normal to the optical disk surface. Thus, the overall height of an optical disk drive using the sled-based architecture of FIG. 3 may be substantially reduced with respect to that provided by a system incorporating the actuator arm of FIG. 2.

As is conventional in a split-optics-based architecture, coarse tracking is achieved by movement of sled 305 on rails. For example, sled 305 may be mounted on rails (not illustrated) through apertures 310 and bearing 320. As sled 305 is displaced on these rails, a beam projected by a lens 440 will move radially across the corresponding optical disk, thereby changing track locations. In addition, lens 440 may be displaced by a two-dimensional actuator (not illustrated) that may either radially or axially displace lens 440 with respect to the optical disk as necessary for fine tracking and focusing purposes. With respect to focusing, lens 440 acts in the far field in that it is many wavelengths removed from the corresponding optical disk. There is a limit to the effective numerical aperture that can be obtained in such a system. In turn, this limit places a limit on the achievable data density on the corresponding optical disk, a limit that is exacerbated in a small form factor system.

Accordingly, there is a need in the art for small form factor optical disk drives supporting improved data densities.

SUMMARY

In accordance with an aspect of the invention, an optical disk drive includes: a movable sled; an optical pick up unit (OPU) connected to the sled, the OPU including a laser configured to transmit a laser beam parallel to an optical disk surface; a means for redirecting the transmitted laser beam normally to the optical disk surface; an objective lens and solid immersion lens (SIL) assembly configured to focus the redirected beam onto the optical disk; and an actuator for moving the assembly to change a position of the focused beam, wherein the laser has a coherence function that depends upon a roundtrip optical path length of the laser beam, the coherence function having coherence value maxima spaced apart by intervals, and wherein the disk drive is configured so that the roundtrip optical path length of the laser beam is such that a coherence value for the laser is in one of the intervals.

In accordance with another aspect of the invention, an optical disk drive includes: a rotary actuator arm having a laser for transmitting a laser beam and an objective end, the rotary actuator being mounted on an axis that as the rotary actuator rotates on the axis the objective end moves in a tracking direction with respect to an optical disk; and an objective lens and solid immersion lens (SIL) assembly mounted to the objective end of the rotary actuator, the SIL being configured to focus the laser beam from the laser source onto the optical disk, wherein the laser has a coherence function that depends upon a roundtrip optical path length of the laser beam, the coherence function having coherence value maxima spaced apart by intervals, and wherein the disk drive is configured so that the roundtrip optical path length of the laser beam is such that a coherence value for the laser is in one of the intervals.

In accordance with another aspect of the invention, a near field optical disk includes: a substrate; and a plurality of information layers spaced apart by spacer layers, wherein each of the spacer layers comprises a composite material having dispersed nano-particles contained therein such that the spacers layers have an index of refraction greater than an effective numerical aperture of an objective lens and SIL lens combination in a corresponding near field optical disk drive.

BRIEF DESCRIPTION OF THE DRAWINGS

The present invention may be better understood, and its numerous objects, features and advantages made apparent to those skilled in the art by referencing the accompanying drawings. The use of the same reference number throughout the figures designates a like or similar element.

FIG. 1a is a cross-sectional view of an optical pick-up unit (OPU).

FIG. 1b illustrates the optical paths through the OPU of FIG. 1a.

FIG. 2 is a perspective view of an optical disk drive actuator arm containing the OPU of FIG. 1a.

Figure 3:
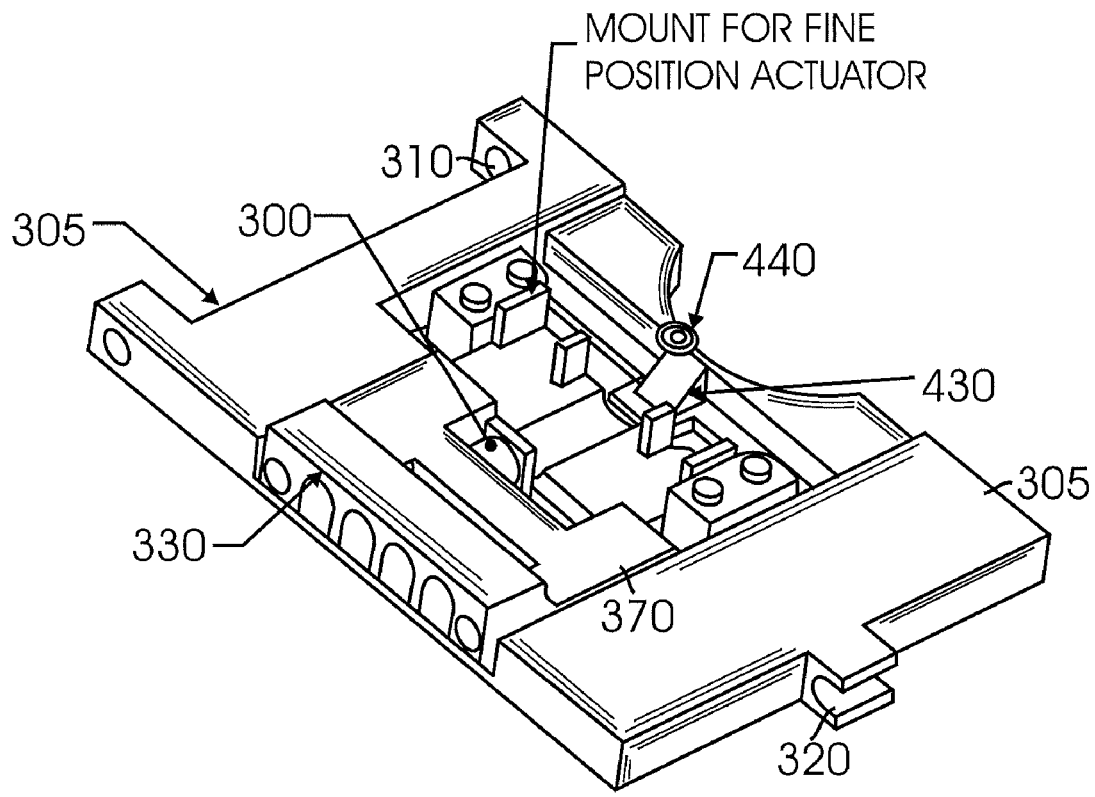
FIG. 3 is a perspective view of a sled-mounted OPU in accordance with an embodiment of the invention.

While the invention is susceptible to various modifications and alternative forms, specific embodiments thereof are shown by way of example in the drawings and will herein be described in detail. It should be understood that the drawings and detailed description thereto are not intended to limit the invention to the particular form disclosed; on the contrary, the intention is to cover all modifications, equivalents, and alternatives falling within the spirit and scope of the present invention as defined by the appended claims.

DETAILED DESCRIPTION

To advance the state of the art for small form factor optical disk drives, a Solid Immersion Lens (SIL)-based architecture is provided. As known in the arts, the storage capacity of an optical recording system is determined by the focused spot interacting with the optical medium. In the present invention, this focused spot size is reduced because the focused spot is formed inside a SIL having an index of refraction n. In one embodiment, the SIL may be implemented using a high index of refraction material such as GaP, which has an index of refraction (n) of 3.3 at the red light wavelength used in conventional DVD players. Note that the areal data density in inversely proportional to the squared value of the spot size, which is proportional to $n^2$ for a type of SIL that may be denoted as a "simple" SIL. A simple SIL comprises a sphere sliced at it's midpoint to form a hemisphere. A simple SIL formed from GaP having an index of refraction of 3.3 provides over an order of magnitude data capacity gain with respect to a conventional far field optical disk drive operating at the same wavelength. The data capacity gain may be further increased using a type of SIL lens that may be denoted as a "super" SIL. Whereas a simple SIL comprise a hemisphere, a "super" SIL may be formed by slicing a sphere of radius r and index n at a distance (r/n) below it's mid point diameter such that a beam converging toward a point at a distance (r/n) below the mid point is focused to the (r/n) point without introducing aberrations. The spot size is proportional to $n^4$ in a super SIL. Thus, a super SIL formed from GaP having an index of refraction of 3.3 provides over two orders of magnitude data capacity gain with respect to a conventional far field optical disk drive operating at the same wavelength. A super SIL may also be used to provide a means for focusing (r/n) below the hemispherical shape onto information layers buried in the media. The SIL-based architecture disclosed herein may use either a simple or a super SIL. However, because simple SILs are subject to substantially less tolerance demands, the following implementations are simple-SIL-based architectures. It will be appreciated, however, that corresponding super SIL architectures could also be used and are included within the scope of the invention.

Figure 4:
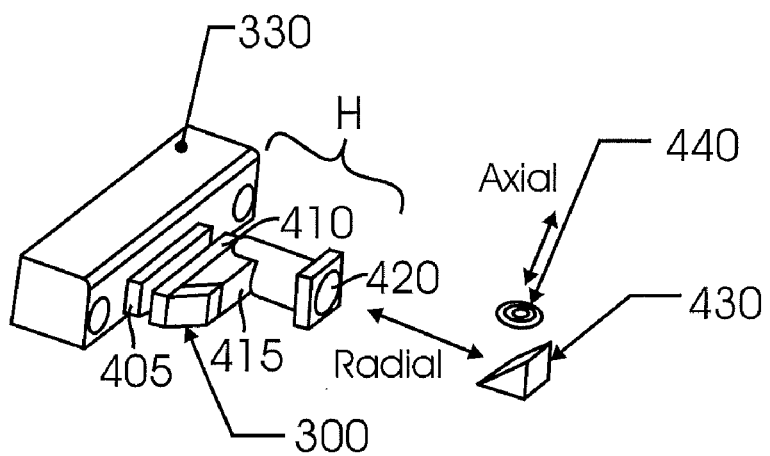
FIG. 4 illustrates the orientation of the OPU, turning mirror, and the lens of FIG. 3.
Figure 5:
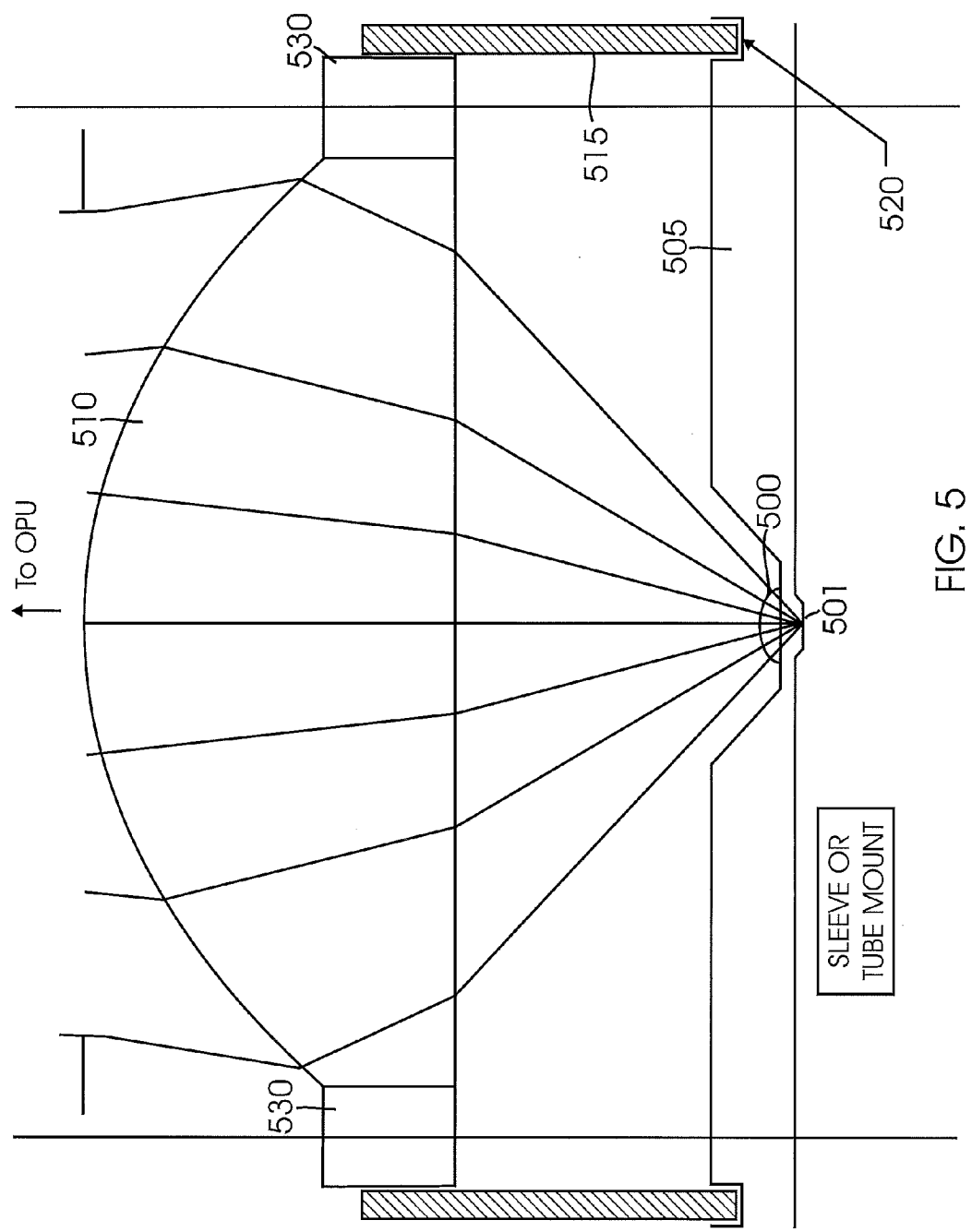
FIG. 5 illustrates a SIL/objective lens mounting using a sleeve tube in accordance with an embodiment of the invention.

Small form factor SIL-based optical disk drives may be constructed using rotary actuator arms such as that discussed with respect to FIG. 2 and also the sled-based architecture discussed with respect to FIGS. 3 and 4. For example, in a sled-based architecture, lens 440 of FIGS. 3 and 4 may comprise a SIL/objective lens assembly 550 as seen in FIG. 5. With respect to a rotary arm embodiment, referring again to FIG. 2, a lens 90 in a rotary actuator arm embodiment may comprise SIL/objective lens assembly 550. In a sled-based embodiment, it will be appreciated that the OPU 300 may be configured within sled 305 such that the laser beam is projected normally towards the disk surface rather than parallel to the disk surface as seen in FIG. 4. In such an embodiment, the necessity of turning mirror 430 is removed.

Actuation of SIL/objective lens assembly 550 for focus and fine tracking purposes may be achieved using conventional sled-based actuators in a sled-based embodiment. As seen in FIG. 5 for SIL/objective lens assembly 550, a SIL 500 may be formed in a GaP substrate 505 or other suitable high-index-of-refraction materials. An objective lens such as an aspheric lens 510 corrects for focus as necessary. Control of tracking and focus of a rotary actuator arm may occur as described in U.S. Ser. No. 09/950,378. Regardless of whether a rotary actuator arm or a sled-based architecture is used, the resulting optical disk drive is adapted such that an optical path length is as follows.

Referring back to FIG. 4, for example, a laser diode (not illustrated) included within OPU 300 on silicon submount 405 will have an output power that consists of a series of lasing modes separated by a characteristic spacing given as:

$$\Delta\lambda = \lambda^2/2nL$$

where $\lambda$ equals the average output wavelength, n is the index of refraction in the laser active region of the laser diode, and L is the length of the laser cavity. This spacing of $\Delta\lambda$ drives a spacing $\Delta L$ of the coherence function for the laser beam from OPU 300, which equals:

$$\Delta L = \lambda^2/\Delta\lambda = 2nL$$

Should $\lambda$ equal 654 nm, the index of refraction n equal 4.23, and L equal 350 nm, $\Delta L$ becomes approximately 3 mm. The coherence function depends upon the roundtrip optical path length (OPL) from the laser to the media and back to the laser, which may also be referred to as the optical path difference (OPD) of the light reentering the laser, i.e, feedback light, and the light inside the laser cavity. The roundtrip optical path length is defined by the roundtrip distance the laser beam takes from the laser diode through the OPU and SIL/objective lens assembly to the information layer of the optical disk being read or written to. Those of ordinary skill in the art will appreciate that the OPL/OPD does not exactly correspond to the physical distance of such a path but must also account for the relative indices of refraction in the objects along this path.

The strength of maxima in the coherence function versus the OPL/OPD is a function of the laser linewidth, i.e, the width of a single lasing mode. The broader the linewidth, the more rapidly the maxima diminish versus OPL/OPD. Thus, as the form factor of an optical disk drive is decreased, the maxima in the coherence function become more problematic causing an increase in the laser feedback noise effects and increased interference phenomena from stray light and ghost reflections in the OPU.

In general, a typical laser diode has a cavity length of between approximately 100 and 1000 um. The effective index of refraction for the cavity for wavelengths used in DVD-type devices is typically around 4.23. Thus, the spacing $\Delta L$ for achievable coherence functions will generally range between about 850 um to about 8500 um. Referring back to FIG. 4, movement of sled 305 on its rails for coarse tracking should not affect the optical path length assuming that the optical disk axial runout is within acceptable tolerances. However, actuation of SIL/lens assembly 440 for focusing will affect the optical path length. This actuation should not exceed several hundred microns for normal optical disk axial runout tolerances (within a few hundred microns). In turn, OPU 300 is mounted on sled 305 such that the median optical path length lies between coherence function maxima, preferably substantially at a midpoint between adjacent maxima. Thus, given that the maximum optical path length variation will be less than 850 microns, the avoidance of coherence function maxima is assured. The same considerations would apply to the optical path length in a rotary-actuator based embodiment.

SIL 500 may be formed from GaP substrate 505 using the wafer etching process described in U.S. Ser. No. 10/278,719, filed Oct. 22, 2002, the contents of which are incorporated by reference. In this fashion, a "micro" SIL 500 may be formed having a diameter less than 100 microns. The curved upper surface will be spherical. The wafer may be etched with mounting features for attaching SIL 500 with respect to an objective lens. The lower surface of SIL 500 may have a small flat protruding area 501. The purpose of the small protruding area is to minimize the possibility of contact between SIL 500 and the media by reducing the area that is maintained very close to the media. The distance from the spherical top surface to the protruding bottom surface is controlled via the etching process and suitable monitoring means to determine that SIL 500 has the required thickness. Having formed SIL 500, it should be coupled to objective lens 510 such that SIL 500 is aligned not only in the X, Y, and Z dimensions but also in the pitch and roll axes as well. 6-axis actuators capable of such precise positioning of optical components are known in the art. An interferometer is then used to indicate wavefront quality of a laser beam reflected from a bottom surface 501 of SIL 500 and back through objective lens 510 (cat's eye reflector formation). A portion of the incident laser beam on this surface of SIL 500 is reflected due to the difference in the index of refraction between air and that for substrate 500. The wavefront pattern displayed by the interferometer indicates whether SIL 500 is properly aligned with objective lens 510. Having used the actuator to orient SIL 500 with respect to objective lens 510, they should then be rigidly connected to each other. For example, a sleeve (which may also be denoted as a tube) mount 515 may be connected to substrate 505 through etched grooves 520. Objective lens 510 also receives sleeve mount 515 through lens flanges 530. Once the components have been properly positioned through actuation of a suitable actuator such as a 6-axis actuators, objective lens 510 may be rigidly mounted to sleeve mount 530 through, for example, the curing of UV optical adhesive. It will be appreciated that sleeve mount 530 need envelop the complete circumferences of SIL 500 and objective lens 510 but instead may merely envelop portions of these circumferences.

Figure 6:
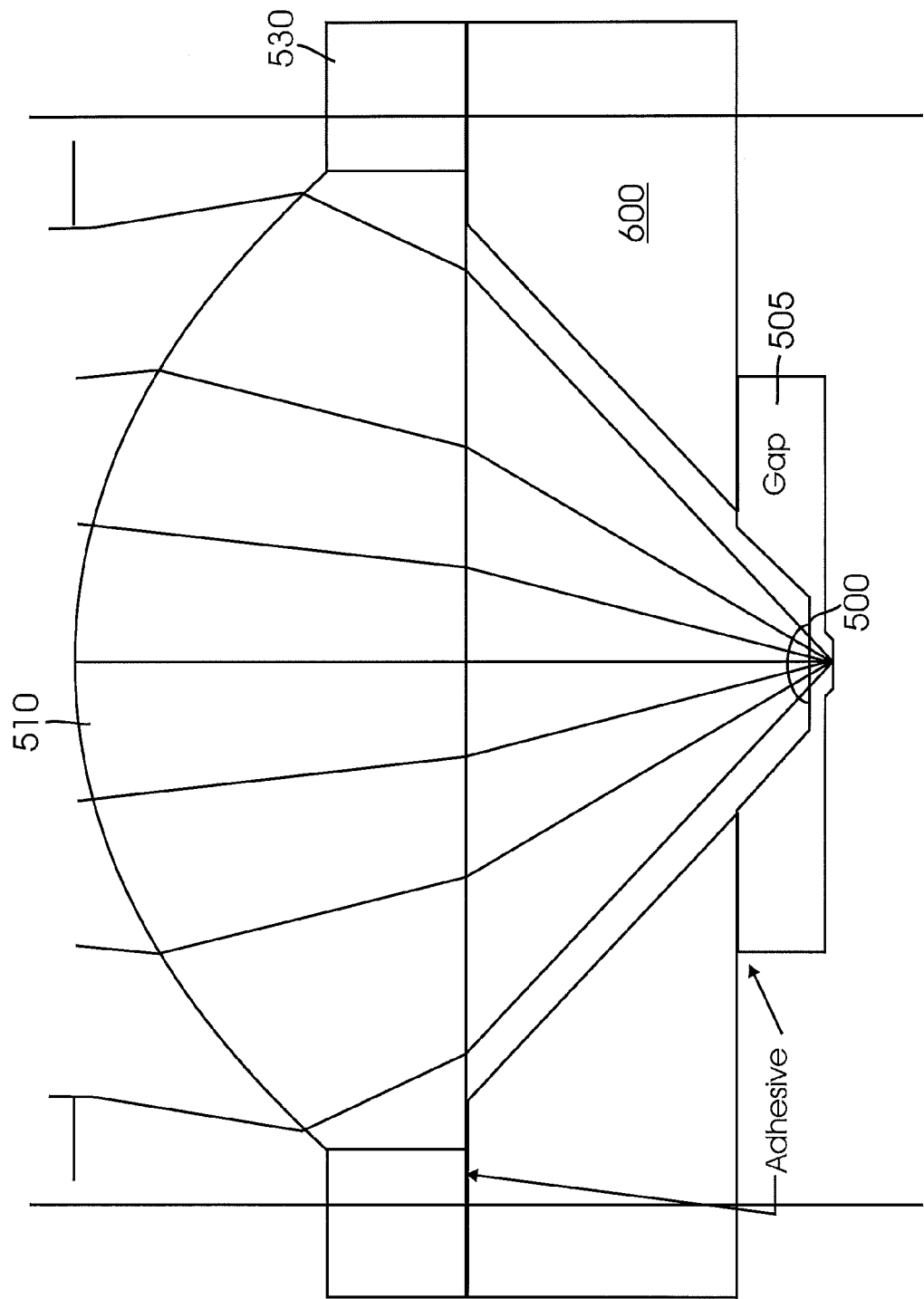
FIG. 6 illustrates a SIL/objective lens mounting using a spacer in accordance with an embodiment of the invention.

An alternative mounting is illustrated in FIG. 6. Here, SIL 500 is connected to objective lens 510 through a spacer 600 having a tapered aperture. Note that the alignment may be either with respect to the objective lens 510 in that this lens may be held stationary and SIL 500 moved until the desired alignment is achieved. Alternatively, SIL 500 may be held stationary and objective lens 510 moved until the desired alignment is achieved. In yet another alternative embodiment, both structures could be mounted to actuators and positioned with respect to each other. Regardless of how the structures are positioned, substrate 505 and flanges 530 may be adhered using optical adhesive to opposing surfaces of spacer 610. As discussed above with respect to sleeve mount 530, spacer 600 need not envelop the entire circumferences of SIL 500 and objective lens 510 but instead may merely envelop a portion of these circumferences.

Figure 7:
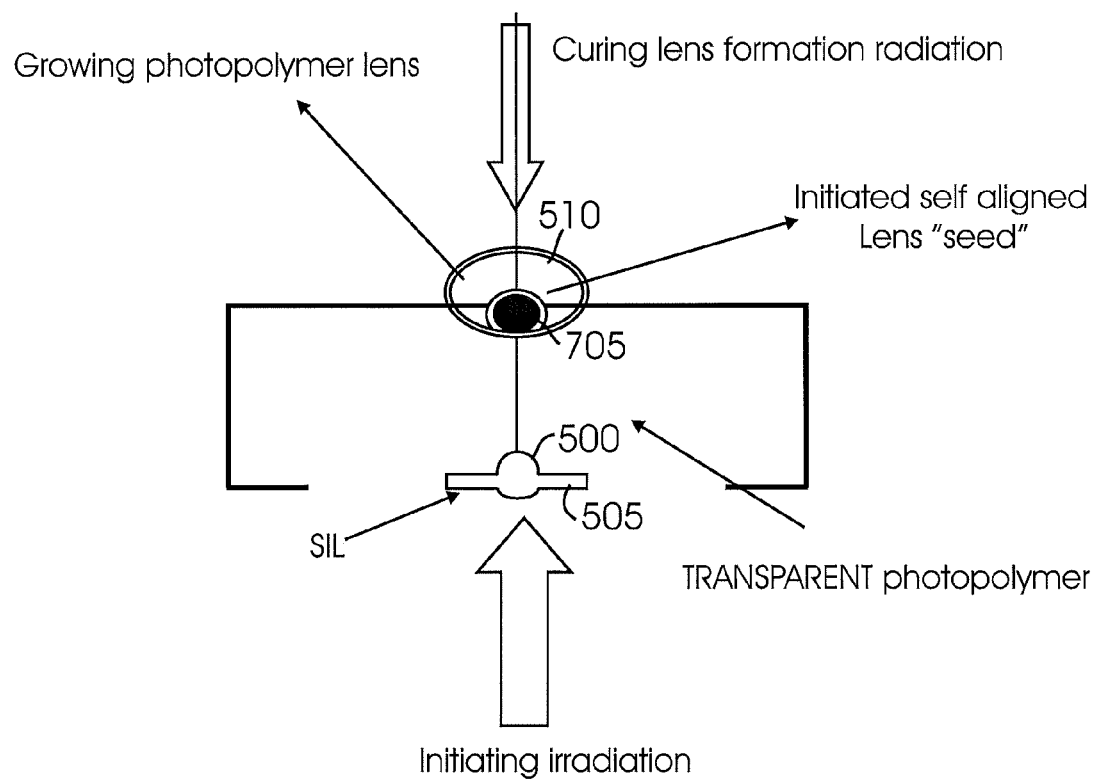
FIG. 7 illustrates a photopolymer lens curing technique to form a self-aligned objective lens in accordance with an embodiment of the invention.

In both FIG. 5 and FIG. 6, an air gap separates SIL 500 and objective lens 510. This air gap may be filled with UV photopolymer and cured to form a solid structure. Indeed, the mounting techniques described above may be avoided should objective lens 510 itself may be formed from photopolymer as described in U.S. Provisional Application No. 60/671,953, filed Apr. 15, 2005, the contents of which are hereby incorporated by reference in their entirety. For example, as seen in FIG. 7, initiating radiation may be transmitted through SIL 500 (contained within substrate 505) through transparent photopolymer 700. This radiation forms a self-aligned lens seed 705. Curing lens formation may then be used from the objective lens side to complete formation of objective lens 510. In this fashion, a self-aligned SIL/objective lens assembly may be completed without the need for positioning using actuators such as a 6-axis actuator.

Figure 8:
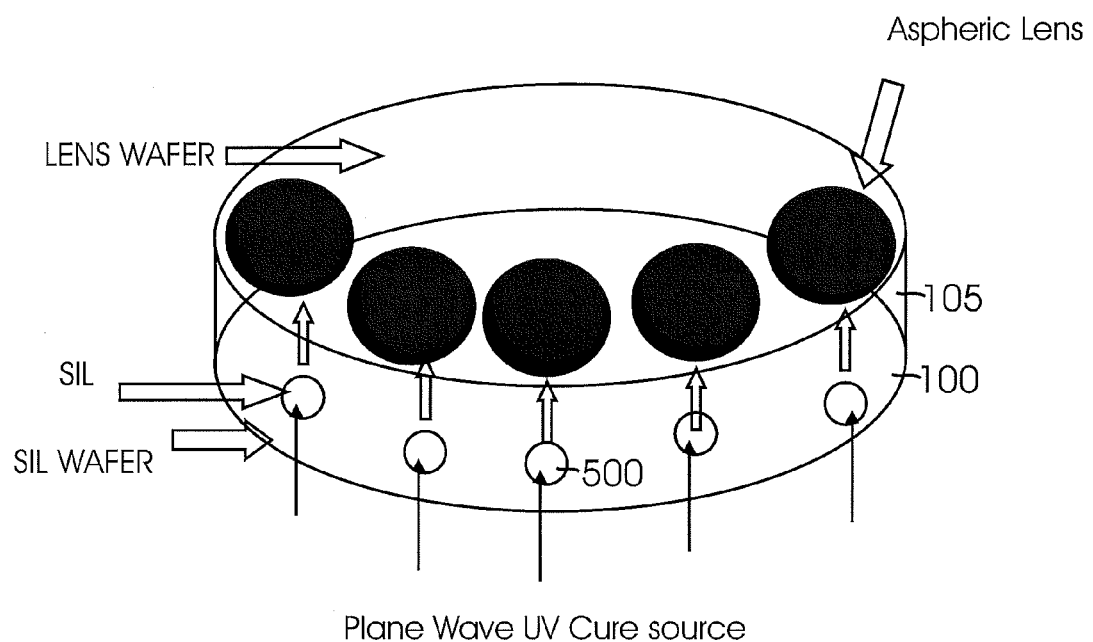
FIG. 8 illustrates a wafer-scale implementation of the process illustrated in FIG. 7 in accordance with an aspect of the invention.

Turning now to FIG. 8, a wafer 800 may be etched to form multiple SILs 500. A layer 805 of photopolymer may then be spin coated over wafer 800. A plane wave irradiated through SILs 500 may then form self-aligned seeds as described with respect to FIG. 8. Photopolymer layer 805 may then be irradiated to form objective lenses 510. After curing of photopolymer layer 805, the resulting self-aligned SIL/objective lens assemblies may be diced to separate the individual assemblies.

Figure 9:
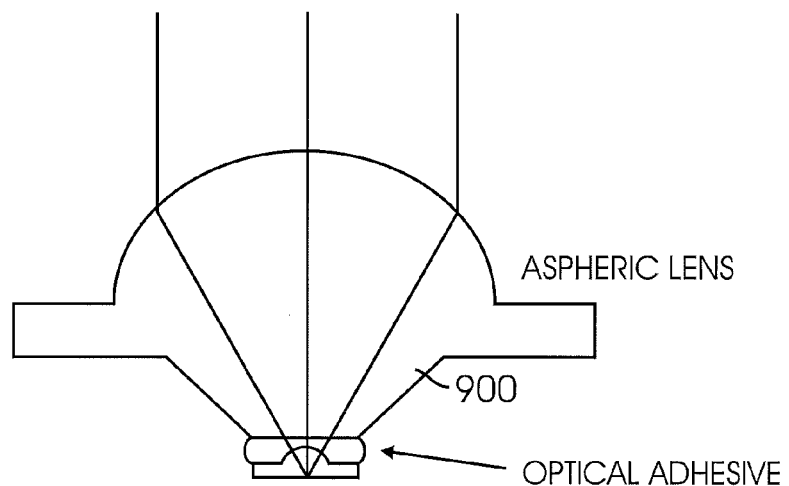
FIG. 9 illustrates an objective lens modified to reduce the optical adhesive thickness in accordance with an embodiment of the invention.

Should a self-aligned process not be used, objective lens 510 may be modified to include a lens portion 900 that forms a "beak" as illustrated in FIG. 9. Because of the projection of lens portion 900, a relatively small thickness of optical adhesive may be used between SIL 500 and objective lens 510. Once these components are aligned as described previously, the optical adhesive may be cured to rigidly connect these components together. In addition, SIL 500 may be configured with a break-away tab that is held by the positioning actuator during alignment. Once the optical adhesive has cured, this tab may be removed. Note the advantage of having the air gap shown in FIGS. 5 and 6 filled with optical adhesive—an anti-reflection coating on the SIL-adjacent surface of objective lens 510 is unnecessary because the indices of refraction for objective lens 510 and the cured adhesive are very similar.

Figure 10:
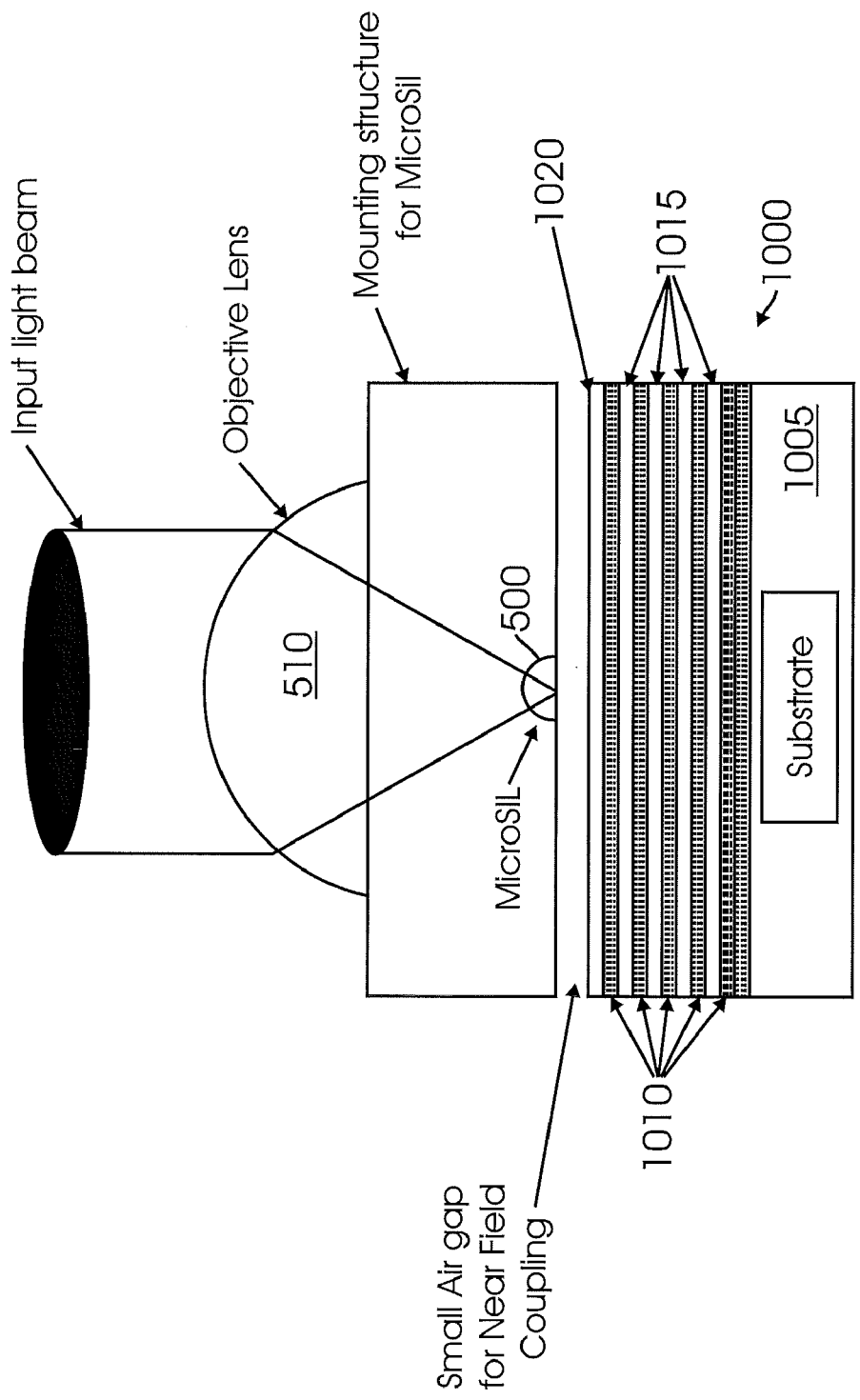
FIG. 10 is a cross-sectional view of a multiple layer information disk and a corresponding SIL/objective lens assembly in accordance with an embodiment of the invention.

Regardless of how the SIL and objective lens are connected together, the resulting effective numerical aperture allows the bit feature size on the corresponding optical disk to be greatly reduced with respect to a conventional far field optical system, providing much higher data density for comparable disk size. This data density enhancement can be further increased through the use of multiple information layer disks. For example, FIG. 10 illustrates the use of a SIL/objective lens assembly to illuminate an optical disk 1000 having a substrate 1005. Multiple information layers 1010 are separated by transparent spacer layers 1015. A cover layer 1020 protects optical disk 1000. SIL 500 rides above cover layer 1020, separated by a near-field air gap.

Spacer layers 1015 should have an index of refraction greater than the effective numerical aperture (NAeff) achieved by the SIL/objective lens assembly to support propagating waves necessary for efficient coupling. If the refractive index of spacer layers 1015 is less than NAeff, the coupling becomes evanescent. In turn, such evanescent coupling requires very thin spacer thicknesses such that a focus on a particular information layer 1010 becomes problematic. To achieve a suitably high index of refraction, a composite material having dispersed nano-particles may be used. For example, spacers 1015 may be formed using poly p-phenylenevinylene (PPV) in which is dispersed 50 angstrom silica particles. Alternatively, $TiO_2$ or $ZrO_2$ nano-particles may be used. Rather than uses a nano-particle layer, sputtered inorganic films such as ZnS, $Si_3N_4$, SiN, $ZnS$—$SiO_2$ may be used.

A near-field recording disk such as disk 1000 requires a close tolerance on its flatness. Warpage of the disk surface would place severe demands on the focus servo, which must operate to keep the proper gap between the disk surface and the SIL. To maintain symmetry, a suitable near field disk should have both sides stamped (in a double-sided embodiment) and coated with thin films, thereby eliminating any laminations. This balances any stress from thin film asymmetry, which is a significant source of warpage in plastic (such as polycarbonate) disks. It also avoids the stress induced from lamination pressure and/or heating and non-uniformity of adhesive used between laminations.

Figure 11:
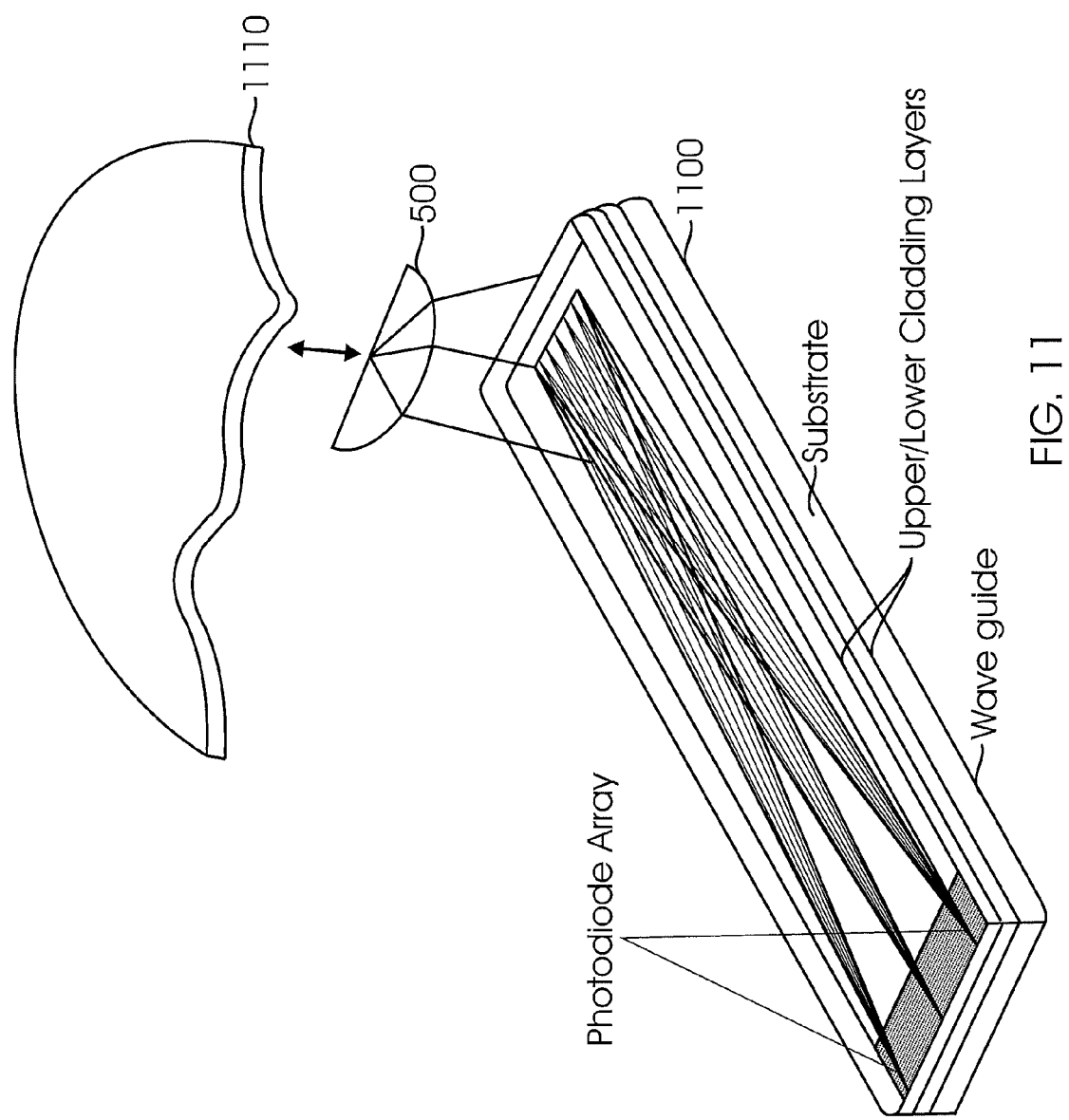
FIG. 11 is a perspective view of an integrated optic device pick up and SIL assembly in accordance with an embodiment of the invention.

As discussed in commonly-assigned U.S. Ser. No. 11/052,367, filed Feb. 7, 2005, the contents of which are hereby incorporated by reference in their entirety, a sled-based optical disk drive architecture is advantageous for small-form factor applications because a height H of OPU 300 lies parallel to an optical disk surface (not illustrated but adjacent SIL/objective lens assembly 440) as seen in FIG. 4. In contrast, this height H for a rotary-actuator-arm-based embodiment such as that illustrated in FIG. 2 will add to the thickness of the optical disk and any associated cartridge. However, a SIL-based embodiment reduces this addition in that the separation between the SIL and the disk surface is greatly reduced. Moreover, the use of an integrated optic device pick up (IODPU) further reduces the Z height in a rotary actuator arm/SIL-based architecture. For example, as seen in FIG. 11, an IODPU 1100 includes a focusing grating coupler that acts as an objective lens and turning mirror to optical reflections from optical disk 1110 that are focused in SIL 500 that lies between IODPU 1100 and disk 1110. Those of ordinary skill will appreciate that the integration of IODPU 1100 with a SIL lens solves a problem encountered by far field use of such devices. In a far field configuration, the design of the focusing grating coupler is expensive and difficult to achieve the necessary numerical aperture. In particular, achievement of the diffraction limited high numerical apertures required in modern OPUs (NA greater 0.7) has proven to be very difficult. However, because of the relatively high numerical aperture provided by a SIL lens, the effective numerical aperture demands on the focusing grating coupler are relaxed, thereby lowering manufacturing costs. In addition, the integrated optics in IODPU 1100 can eliminate the need for discrete beam splitters, detectors, and collimating lenses but have had great difficulty in achieving the diffraction limited high numerical apertures required in modern OPUs (NA greater 0.7). However, through integration with a SIL/objective lens assembly, these high numerical apertures are achievable. The total height of IODPU 1100 and an associated SIL/objective lens assembly can be less than 0.5 mm, thereby alleviating the height concerns raised by the use of a rotary arm architecture. It will be appreciated that IODPU 1100 may also be used in a sled-based architecture as well.

Figure 12A:
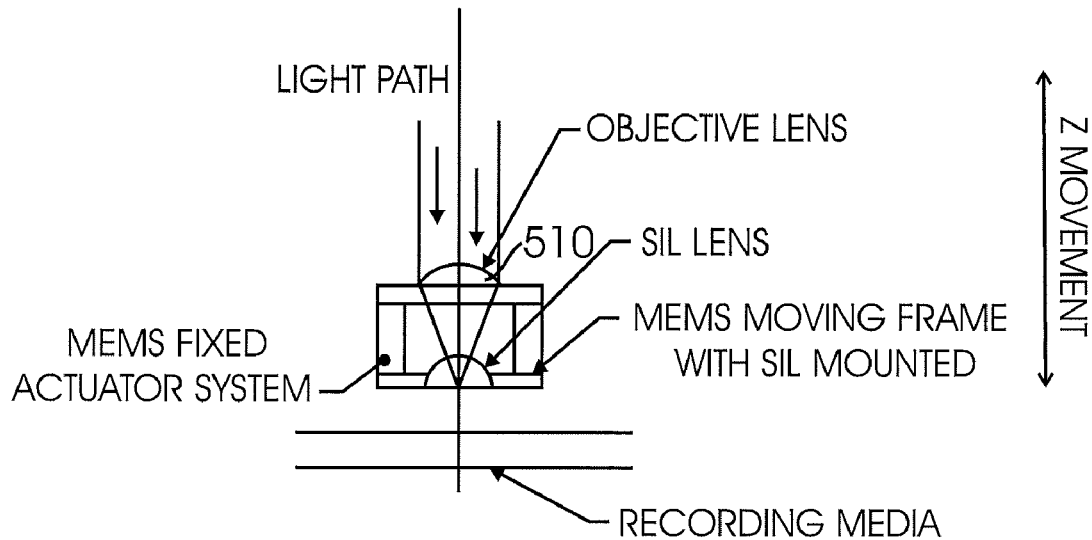
FIG. 12a is a cross-sectional view of a SIL/objective lens assembly incorporating MEMs actuators in accordance with an embodiment of the invention.
Figure 12B:
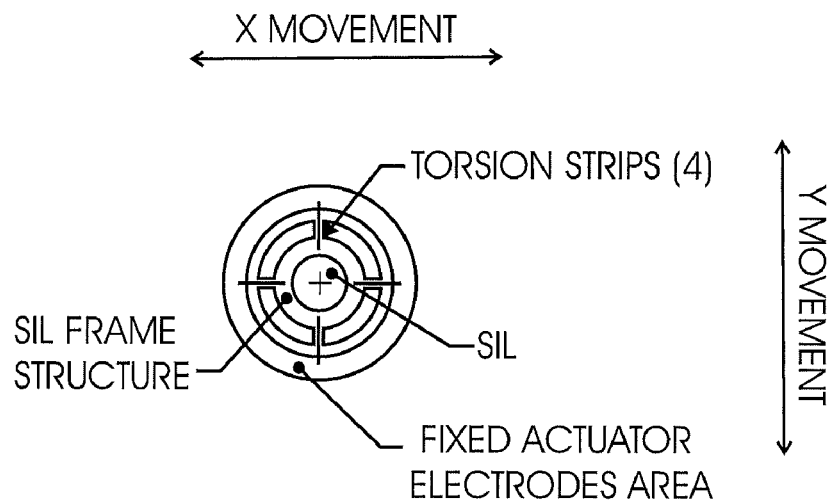
FIG. 12b is a cross-sectional view of the SIL/objective lens assembly of FIG. 12a taken along line A-A.

As discussed with respect to FIGS. 5 and 6, the SIL and objective lens must be carefully aligned before they are fixed within a mounting with respect to each other. One way to alleviate the alignment necessities are the self-aligned SIL/objective lens mounting techniques discussed above with respect to FIGS. 7 and 8. In addition, a micro-electro-mechanical-system (MEMS) mounting may be used as shown in FIGS. 12*a* and 12*b*. MEMS actuators 1200 in combination with torsion strips 1205 allow actuation of SIL 500 in the X, Y, and Z planes with respect to objective lens 510 so that the necessary alignment is obtained. Actuators 1200 may be formed using electro-static, piezo-electric, or shape-memory alloy implementations as known in the MEMS arts. Another way to alleviate the alignment complexities with respect to mounting a SIL lens with respect to an objective lens is to form the objective lens on the spherical surface of the SIL. For example, referring back to FIG. 5, the upper spherical surface of SIL 500 could include a diffraction grating that acts as an objective lens. In this fashion, a discrete objective lens such as lens 510 is unnecessary.

Although the invention has been described with respect to particular embodiments, this description is only an example of the invention's application and should not be taken as a limitation. For example, the wavelengths, numerical apertures, disk capacity and topology, and other factors specifically described herein are merely exemplary. Consequently, the scope of the invention is set forth in the following claims.

We claim:

1. An optical disk drive, comprising:
    a movable sled;
    an optical pick up unit (OPU) connected to the sled, the OPU including a laser configured to transmit a laser beam;
    an objective lens and solid immersion lens (SIL) assembly configured to focus the laser beam onto the optical disk;
    and an actuator for moving the assembly to change a position of the focused beam, wherein the laser has a coherence function that depends upon a roundtrip optical path length of the laser beam, the coherence function having coherence value maxima spaced apart by intervals, and wherein the disk drive is configured so that the roundtrip optical path length of the laser beam is within one of the intervals.

2. The optical disk drive of claim 1, wherein the disk drive is configured such that the optical path length is located substantially in the middle of the one interval.

3. The optical disk drive of claim 1, wherein the objective lens is an aspheric lens and wherein the OPU is configured within the sled so as to project the laser beam parallel to the laser disk surface, the optical disk drive further comprising a turning means for redirecting the parallel-directed laser beam to the objective lens and SIL assembly.

4. The optical disk drive of claim 3, wherein the SIL has a diameter of less than 100 microns and the turning means comprises a focusing grating coupler.

5. The optical disk drive of claim 1, wherein the SIL is etched from a substrate.

6. The optical disk drive of claim 1, further comprising micro-electro-mechanical system (MEMS) actuators configured to movably couple the SIL to the objective lens.

7. The optical disk drive of claim 5, wherein the assembly includes a sleeve mount to mount the substrate to the objective lens.

8. The optical disk drive of claim 5, wherein the assembly includes a spacer to mount the substrate to the objective lens.

9. An optical disk drive, comprising:
    a rotary actuator arm having a laser for transmitting a laser beam and an objective end, the rotary actuator being mounted on an axis that as the rotary actuator rotates on the axis the objective end moves in a tracking direction with respect to an optical disk;
    and an objective lens and solid immersion lens (SIL) assembly mounted to the objective end of the rotary actuator, the SL being configured to focus the laser beam from the laser source onto the optical disk, wherein the laser has a coherence function that depends upon a roundtrip optical path length of the laser beam, the coherence function having coherence value maxima spaced apart by intervals, and wherein the disk drive is configured so that the roundtrip optical path length of the laser beam is within one of the intervals.

10. The optical disk drive of claim 9, wherein the disk drive is configured such that the optical path length is located substantially in the middle of the one interval.

11. The optical disk drive of claim 9, wherein the objective lens is an aspheric lens.

12. The optical disk drive of claim 9, wherein the SIL has a diameter of less than 100 microns.

13. The optical disk drive of claim 9, wherein the SIL is etched from a substrate.

14. The optical disk drive of claim 13, wherein the assembly includes a sleeve mount to mount the substrate to the objective lens.

15. The optical disk drive of claim 13, wherein the assembly includes a spacer to mount the substrate to the objective lens.

* * * * *